US010616971B1

(12) United States Patent
Ajo et al.

(10) Patent No.: US 10,616,971 B1
(45) Date of Patent: Apr. 7, 2020

(54) LED AUTO-DETECT SYSTEM FOR WIDE OUTPUT VOLTAGE RANGE LED DRIVERS

(71) Applicant: Appleton Grp LLC, Rosemont, IL (US)

(72) Inventors: Virgil Roy Requiroso Ajo, Pasig (PH); Leon Dela Cruz Placido, Jr., San Roque Antipolo (PH); Neil Jingo Samson Valmonte, Metro Manila (PH)

(73) Assignee: Appleton Grp LLC, Rosemont, IL (US)

( * ) Notice: Subject to any disclaimer, the term of this patent is extended or adjusted under 35 U.S.C. 154(b) by 0 days.

(21) Appl. No.: 16/163,409

(22) Filed: Oct. 17, 2018

(51) Int. Cl.
*H05B 33/08* (2020.01)
*H02M 3/335* (2006.01)
*H02M 1/44* (2007.01)
*H02M 1/42* (2007.01)

(52) U.S. Cl.
CPC ...... *H05B 33/089* (2013.01); *H02M 3/33576* (2013.01); *H05B 33/0815* (2013.01); *H05B 33/0887* (2013.01); *H02M 1/42* (2013.01); *H02M 1/44* (2013.01)

(58) Field of Classification Search
None
See application file for complete search history.

(56) References Cited

U.S. PATENT DOCUMENTS

| | | | |
|---|---|---|---|
| 2007/0057642 A1* | 3/2007 | Pruett | H05B 41/28 315/247 |
| 2008/0018261 A1* | 1/2008 | Kastner | F21V 23/00 315/192 |
| 2012/0133284 A1* | 5/2012 | Ge | H05B 33/089 315/121 |
| 2014/0265935 A1 | 9/2014 | Sadwick et al. | |
| 2016/0128144 A1* | 5/2016 | Tikkanen | H05B 33/0815 315/301 |
| 2017/0311396 A1* | 10/2017 | Sadwick | F21V 25/00 |

FOREIGN PATENT DOCUMENTS

WO WO 2017/207405 12/2017

OTHER PUBLICATIONS

Written Opinion of the International Searching Authority for related PCT/US2019/055533 application, dated Dec. 13, 2019, 13 pages.

* cited by examiner

*Primary Examiner* — Crystal L Hammond
(74) *Attorney, Agent, or Firm* — McDonnell Boehnen Hulbert & Berghoff LLP

(57) ABSTRACT

A method of managing an output voltage of a LED driver to prevent damage to a LED load coupled thereto from a transient current is described. The method includes energizing a LED driver coupled to a microcontroller circuit. The microcontroller circuit samples a plurality of signals from the LED driver circuit. Moreover, the microcontroller circuit determines if an interruption event has occurred. The interruption event may include a main voltage supply interruption, intermittently removing and reconnecting a load, such as a loose LED load, and hot-swapping one LED load for another. The method further includes preventing a transient current from damaging the LED load if the interruption event has occurred. A system including circuits related to the method are also described.

17 Claims, 3 Drawing Sheets

1

LED AUTO-DETECT SYSTEM FOR WIDE OUTPUT VOLTAGE RANGE LED DRIVERS

BACKGROUND OF THE INVENTION

The present invention relates to managing an output voltage of wide output range LED drivers. Circuits disclosed herein may prevent transient currents from damaging LED arrays connected thereto. Among other implementations, the present invention may protect LED loads from transient currents when using a wide output range LED driver for LED array lighting fixtures. Among the examples described below, the LED driver may control a voltage at the LED such that the LED output is adjusted and any transient current is prevented when a condition occurs that would otherwise cause a transient current at the LED load. Such conditions include loose LED connections (i.e., no loading on the LED driver), AC Mains interruption, hot-swaps, among other possibilities.

Complex, costly, and inefficient analog circuits, requiring a significant number of components, are currently used to manage output voltage and suppress transient currents on LEDs. However, the circuits and methods described herein eliminate the need to rely on dedicated, complicated analog circuits. Designs disclosed herein utilize less components, such as by sharing pins with the microcontroller, and are more cost efficient. Also, rather than having to design unique products for various narrow ranges of applicable LED loads, the LED driver circuits and related methods disclosed herein may be utilized on an array of capacities, thus eliminating the need of an unnecessary proliferation of stock-keeping units (SKUs).

As such, the present invention fulfills a need by more efficiently and cost-effectively protecting LED loads. Moreover, the invention described herein provides a way of managing a wide range LED driver such that the driver can take any LED array within a broad, specified range (as opposed to more specific driver ranges), and connect the LED load to the output of the driver without danger of damaging the LED array due to transient current.

SUMMARY

An example method of managing an output voltage of a LED driver to prevent damage to a LED load from a transient current, as well as corresponding exemplary circuits configured to carry out the example method, are described herein. The method includes energizing a LED driver coupled to a microcontroller circuit. The microcontroller circuit samples a plurality of signals from the LED driver circuit. Moreover, the microcontroller circuit determines if an interruption event has occurred. The interruption event may include a main voltage supply interruption, intermittently removing and reconnecting a load, such as a loose LED load, and hot-swapping one LED load for another. The method further includes preventing a transient current from damaging the LED load if the interruption event has occurred.

In one aspect, a method is described. The method includes energizing a LED driver connected to a microcontroller circuit (MCU). Moreover, a LED load is coupled to the LED driver, and within examples, an output of the LED driver. The method continues to include scanning a LED load voltage outputted by the LED driver to the LED load until a minimum LED load current is detected. Within examples, the minimum LED load current may be considered a predetermined minimum load current and also be the current during steady-state operation of the LED load. Additionally, the method includes stopping the scanning of the LED load voltage and also sampling the LED load voltage once the minimum LED load current is detected. Within examples, the scanning of the LED load voltage may be part of a "capture mode," while sampling the LED load voltage may be part of a "lock mode" that may also lock or determine an output voltage based on the current output.

The method also includes the MCU determining that a main voltage supply is off. The main voltage supply may turn off during an AC main power interruption scenario or event. The main voltage supply is connected to the LED driver. When the main voltage supply is off, the method further includes stopping the sampling of the LED load voltage. The method continues to include determining that the main voltage supply has returned, or that the main voltage supply has been restored or turned on. Based on this determination, the method includes beginning to re-scan the LED load voltage until the minimum LED load current is detected again. During this time, the method may include ramping up or increasing the output voltage until that minimum LED load current is reached. Moreover, based on the determination that the main voltage supply has returned, the method includes dissipating a residual charge in an output capacitor within the LED driver until the output capacitor is discharged. The dissipating is completed by the LED driver. Finally, the method includes re-energizing the LED driver based on the output capacitor now being discharged.

Within related embodiments, the method may further include reducing a risk of exposing the LED load to a transient current by dissipating the residual charge. In yet further embodiments, the method may include transmitting a discharge control signal, by the MCU to the LED driver. The discharge control signal may initiate the dissipation of the residual charge. Transmitting the discharge control signal may be triggered based on the determination that the main voltage supply has returned, among other examples. In yet further examples, the dissipating of the charge of the output capacitor may include turning on a field-effect transistor (FET) coupled to a resistor across the output capacitor. The discharge signal may turn the FET on, among other possibilities.

In another aspect, another method is described. The method includes energizing a LED driver connected to a microcontroller circuit (MCU). Moreover, a first LED load is coupled to the LED driver, and within examples, an output of the LED driver. The method continues to include scanning a LED load voltage outputted by the LED driver to the first LED load until a minimum LED load current is detected. Additionally, the method includes stopping the scanning of the LED load voltage and also sampling the LED load voltage once the minimum LED load current is detected.

The method continues to include the MCU determining that the first LED load is no longer coupled to the energized LED driver. Based on this determination that the first LED load is no longer coupled, the method includes stopping the sampling of the LED load voltage as well as re-starting the scanning of the LED load voltage. The scanning will again continue until the minimum LED load current is detected. Additionally, the method includes turning on the LED driver for a predetermined short amount of time by a control signal from the MCU, while the MCU is scanning the LED load voltage. Moreover, while the LED driver is on for the predetermine short amount of time, the method includes dissipating a residual charge at an output capacitor of the LED driver by the LED driver. The method continues further to include turning off the LED driver and stopping the dissipating of the residual charge after the short time has passed.

Furthermore, the method includes determining that a second LED load is now coupled to the LED driver. Based on the determination that the second LED load is coupled to the LED driver, the method includes increasing the outputted LED load voltage until the minimum LED load current is detected again. Moreover, based on detecting the minimum LED load current, the method also includes stopping the scanning of the LED load voltage again as well as sampling the LED load voltage of the second LED load.

Within examples, the method disclosed may further include setting a reference voltage based on the sampled LED load voltage of the first LED load, and determining that the outputted LED load voltage is approximately the reference voltage. Continuing with other related examples, the method may further include based on the sampled LED load voltage of the second LED load, adjusting the reference voltage proportionally to the difference between the sampled LED voltage of the first LED load and the sampled LED voltage of the second LED load. Within examples, the second LED load may have a lower effective voltage than the first LED load.

In yet another aspect, a system is described. The system includes a LED driver circuit, a LED load, and a microcontroller. The LED driver circuit itself includes an electromagnetic interference filter (EMI), a power factor correction circuit (PFC), and a direct current to direct current converter (DC/DC converter). The EMI and PFC are coupled, and the PFC is coupled to the DC/DC converter. Moreover, a voltage supply is coupled to the DC/DC converter. The LED load is coupled to an output of the DC/DC converter. The microcontroller is coupled to the LED driver and is configured to sample a plurality of signals from the LED driver circuit, determine if an interruption event has occurred, and if the interruption event has occurred, prevent a transient current from damaging the LED load.

In another aspect still, another system is described. The system includes means for energizing a LED driver coupled to a microcontroller circuit. Additionally, the system includes means for the microcontroller circuit to sample a plurality of signals from the LED driver circuit. Moreover, the system includes means for the microcontroller circuit to determine if an interruption event has occurred. Within examples, the interruption event may include a main voltage supply interruption, intermittently removing and reconnecting a load, such as a loose LED load, and hot-swapping one LED load for another. The system also includes means for preventing a transient current from damaging the LED load if the interruption event has occurred. More particularly, among other examples, the system includes circuits configured as described and depicted in the example Figures provided herein for preventing a transient current from damaging the LED load.

These, as well as other aspects, advantages, and alternatives, will become apparent to those of ordinary skill in the art by reading the following detailed description, with reference where appropriate to the accompanying drawings.

DETAILED DESCRIPTION

Example methods and systems are described herein. The words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein. Moreover, some of the Figures provide detailed circuit diagrams. It should be understood that certain symbols, labels, and arrangements within the circuit diagrams are known in the art. For example, "V" is standard nomenclature in the art for a voltage, "I" for a current, "R" for a resistance, etc.

Existing wide output range LED drivers usually operate with the maximum voltage at the output impressed on a relatively large, bulk capacitor. When specific conditions occur, e.g., no load, loose LED connections, hot-swaps (i.e., disconnecting a load and reconnecting a same or different load while the system is energized), or other interruptions, the voltage level and charge on this capacitor results in high transient output currents when a LED array with a lower voltage rating is connected. The transient output current is usually several times higher than the rated LED pulse currents, and thus, the transient current electrically stresses the LED load resulting in damage or reduction of the LEDs lifetime and/or performance.

To prevent the damage of transient currents, as introduced above, example circuitry of LED drivers configured to drive the LED load while managing the output to the LED load such that the LED load does not experience a damaging transient current.

Figure 1A:
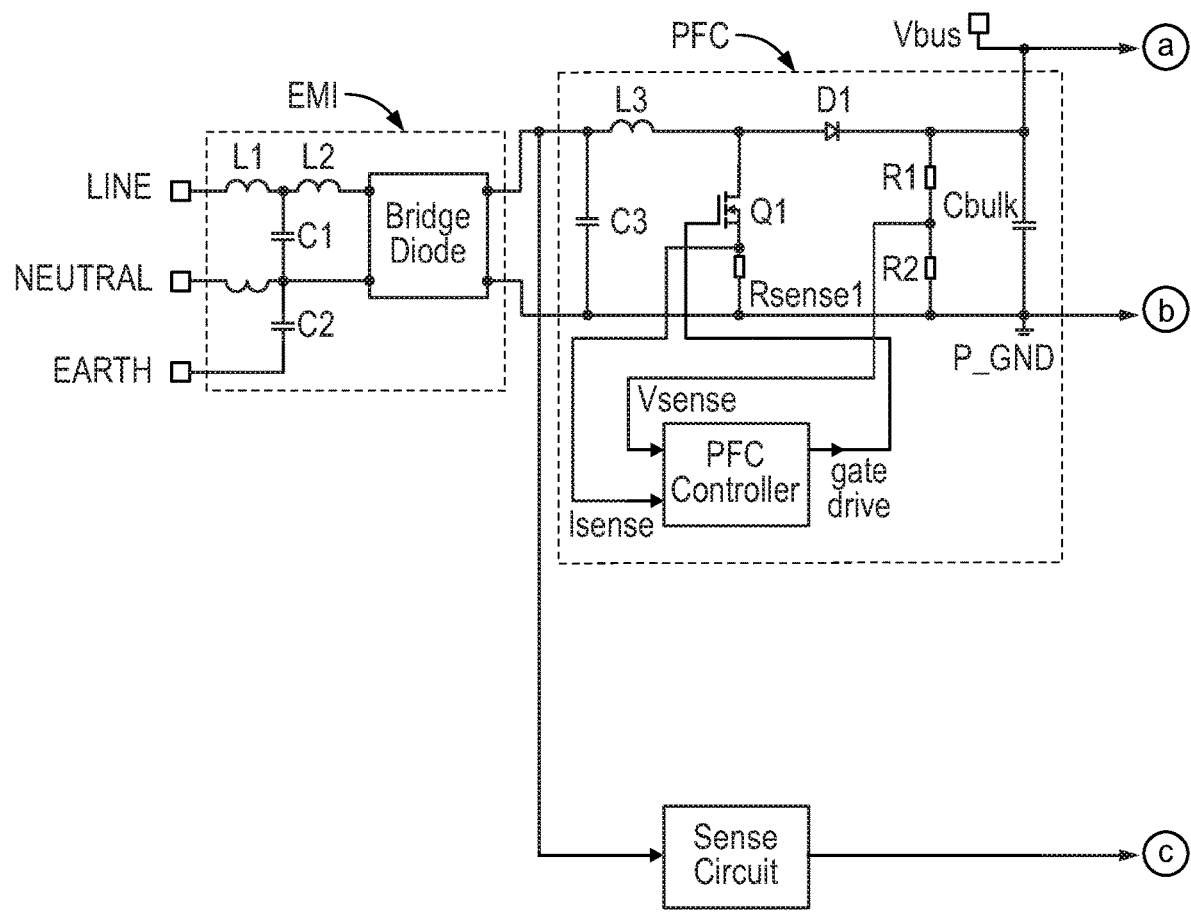
FIG. 1A depicts a simplified block circuit diagram of a LED Driver configured to drive a LED load, according to an example implementation.
Figure 1B:
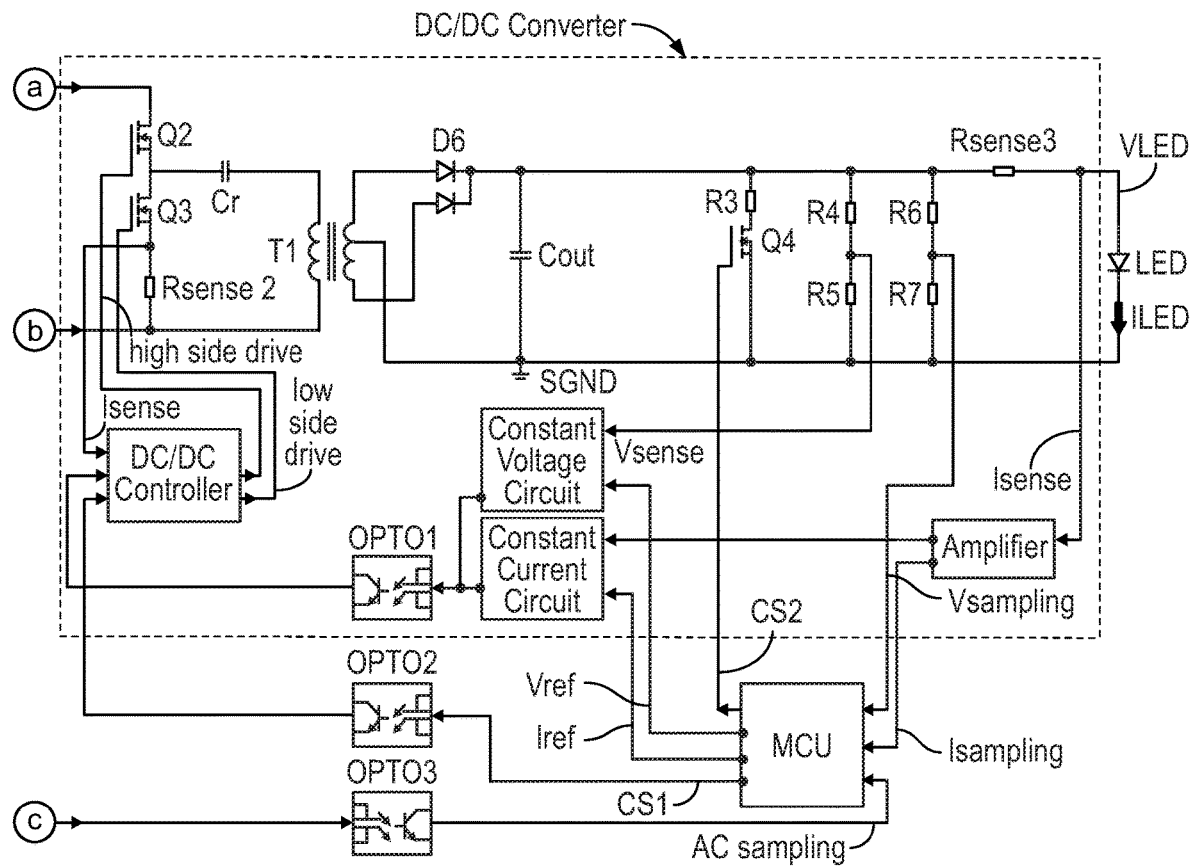
FIG. 1B, a continuation of the view of FIG. 1A, also depicts a simplified block circuit diagram of a LED Driver configured to drive a LED load, according to an example implementation of the present invention.

FIG. 1A and FIG. 1B illustrates a simplified block circuit diagram of a LED Driver configured to drive a LED load. Detailed description of the electrical arrangement and connections of the LED Driver circuit is below, and that is then followed by a description of the operational aspects of the various modules of the LED Driver circuit and connected components.

The LED Driver includes an electromagnetic interference filter (EMI), a power factor correction unit (PFC), and a direct current to direct current converter (DC/DC Converter). Within examples, the EMI is coupled to the PFC. The PFC is further coupled to the DC/DC Converter. The PFC and DC/DC converter are both coupled to a voltage Vbus. Moreover, the LED Driver may be coupled to a microcontroller (MCU), and a LED load (LED). Inputs to the MCU may be coupled from the DC/DC Converter, the EMI, and the PFC while outputs from the MCU may be coupled to the DC/DC Converter (and components thereof). Further, the LED (or LED load) is coupled to the DC/DC Converter of the LED Driver.

Within examples, the EMI includes at least a first inductor L1, a second inductor L3, a first capacitor C1, a second capacitor C2, and a Bridge Diode. The PFC includes a PFC controller, a third inductor L3, a third capacitor C3, a first diode D1, a switch Q1 (a n-channel MOSFET), resistors R1, R2, and Rsense1, and bulk capacitor Cbulk. The DC/DC Converter includes a DC/DC Controller, second switch Q2, a third switch Q3, a resistor Rsense2, a resonant capacitor Cr, a transformer T1, a diode D6, resistors R3, R4, R5, R6, R7, Rsense3, a fourth switch Q4, capacitor Cout, an optical switch OPTO1, an Amplifier, a Constant Voltage Circuit, and a Constant Current Circuit.

Within the EMI, the first capacitor C1 is coupled across the Bridge Diode with the second inductor L2 between the first capacitor and the Bridge Diode. The first inductor L1 is coupled at one end to the LINE and at another end to the first capacitor C1 and the second inductor L2. The second capacitor C2 is coupled at one end to the first capacitor C1, the Bridge Diode, and the NEUTRAL line, and at another end to the EARTH line.

Within the PFC, the third capacitor C3 may be coupled across the Bridge Diode of the EMI. Moreover, one side of the third inductor L3 is coupled to one side of the third capacitor C3. Within examples, one side of a Sense Circuit is coupled to the Bridge Diode of the EMI, the one side of L3, and the one side of C3 of the PFC. Another end of the third inductor L3 is coupled to the drain of the first switch Q1 and the anode side of the first diode D1. The cathode side of the first diode D1 is coupled to one side of resistor R1, to one side of capacitor Cbulk, to Vbus, and to the DC/DC Converter. Another side of R1 is coupled to an input of the PFC Controller and one side of resistor R2. Another side of resistor R2 is coupled to the Bridge Diode, one side of resistor Rsense1, another side of third capacitor C3, another side of Cbulk, ground, and the DC/DC Converter. The other side of Rsense1 is coupled to the source of Q1 and another input of the PFC Controller. The output of the PFC Controller is coupled to the gate of the switch Q1.

Another side of the Sense Circuit may be coupled to a third optical switch OPTO3 which is then coupled to the MCU. The line from OPTO3 to the MCU may include a sample AC signal ACsampling. The cathode side of D1, the resistor R1, capacitor Cbulk, and Vbus may be coupled to the drain of the second switch Q2 of the DC/DC Converter, which may be the input of the DC/DC Converter. The source of Q2 may be coupled to the drain of the third switch Q3 and one side of the capacitor Cr. The other side of Cr may be coupled to one end of a primary winding of the transformer T1. Another end of the primary winding of T1 may be coupled to one side of Rsense2, another side of Cbulk, R2, Rsense1, and the ground coupled of the PFC, as well as the Bridge Diode of the EMI. Another side of R2 is coupled to the source of Q3 and an input of the DC/DC Controller. One output of the DC/DC Controller is coupled to the gate of Q2 (high side drive signal), while another output of the DC/DC Controller is coupled to the gate of Q3 (low side drive signal).

Continuing with the DC/DC Converter, both ends of a secondary winding of the transformer T1 are coupled to the anode sides of diodes D6. The cathode side of the diodes D6 are coupled to one side of capacitor Cout, one side of R3, R4, R6, and Rsense3. The other side of R3 is coupled to the drain of Q4. The other side of R4 is coupled to one side of R5 and the Constant Voltage Circuit—this line provides a voltage signal Vsense. The other side of R6 is coupled to one side of R7 and an input of the MCU—this line provides a sample voltage signal Vsampling. The other side of R3 is coupled to an input of the Amplifier of the DC/DC Conveter and the anode side of the LED. The line from the other side of R3 to the Amplifier may provide a current signal Isense. The anode side of the LED may provide the VLED signal. Outputs of the Amplifier may couple to the Constant Current Circuit as well as another input to the MCU. The line from the Amplifier to the MCU may provide a sample current signal Isampling. The secondary winding of T1, the other side of Cout, the source of Q4, the other side of R5, and the other side of R7 may be coupled to the cathode side of the LED and ground.

Output pins from the MCU may couple to the gate of Q4, the Constant Voltage Circuit, the Constant Current Circuit, and a second optical switch OPTO2. The line from the MCU to OPTO2 may provide a first control signal CS1. The line from the MCU to the gate of Q4 may provide a second control signal CS2. The line from the MCU to the Constant Voltage Circuit may provide a reference voltage signal Vref. The line from the MCU to the Constant Current Circuit may provide a reference current signal Iref.

The control CS1 signal may be between the MCU and a second optical switch OPTO2 that is coupled to the DC/DC Controller of the DC/DC Converter. The control signal CS2 may be between the MCU and the gate of the fourth switch Q4. Further, the reference voltage signal Vref may be between the MCU and the Constant Voltage Circuit, while the reference current signal Iref may be between the MCU and the Constant Current Circuit.

Both the Constant Voltage Circuit and the Constant Current Circuit are coupled to the switch OPTO1 within the DC/DC Converter. OPTO1 may then in turn be coupled to an input of the DC/DC Controller. The switch OPTO2 is also coupled to an input of the DC/DC Controller.

The EMI is configured to filter out RF noise generated by the power supply. The EMI is design so that the system will comply with EMC/Emission standards. The Bridge Diode converts pulsating alternating current (AC) into a rectified waveform that is fed to the PFC input. The PFC of the power supply may reduce harmonics and may improve the power factor of the system. Moreover, the PFC also regulates the voltage Vbus at a fixed voltage.

Within examples described herein, Vbus is applied at the input of the DC/DC Converter. The DC/DC Converter may utilize an LLC Resonant converter. Using the LLC Resonant converter may provide increased efficiency and low emission responses. The second switch Q2 and the third switch Q3 in the DC/DC Converter may chop the fixed Vbus voltage and generate a square waveform. The LLC tank circuit converts that square wave to sinusoidal wave to obtain zero voltage switching (ZVS). The transformer T1 may couple the energy from the primary winding to the secondary winding and may be designed such that the transformer T1 may manage a wide output range of the LED Driver.

As described above, the MCU may provide the reference signals Vref and Iref for the Constant Voltage Circuit and the Constant Current Circuit, respectively. Within examples, the Constant Voltage Circuit may regulate the output voltage during no-load conditions. The Constant Current Circuit may provide constant current during steady-state operation.

Within examples, the MCU may perform sampling of the LED voltage VLED via Vsampling such that the MCU provides a correct signal in Vref. Varying the signal Vref could flexibly change the output voltage based on the voltage across the LED.

As depicted in the example embodiment of FIGS. 1A and 1B, resistors R6 and R7 may scale down the LED voltage and feed to the Vsampling pin of the MCU. Moreover, reference voltage Vref is adjusted in proportion to the sampled voltage Vsampling.

As such, for example, in the event of loose LED connections where the LED is intermittently loaded and unloaded, only a small amount of energy is discharged at capacitor Cout because the maximum output voltage of the LED Driver is close to the LED voltage VLED. Thus, minimal transient current passes through the LED during this example scenario.

Moreover, a LED current ILED is sensed at Isense pin and amplified by the Amplifier before it is fed to the MCU. If the monitored current ILED is less than a minimum load current, then the MCU will determine it as if no LED array or load is connected to the output of the Driver. Within examples, the minimum load of the LED Driver is 100 mA.

Within examples, when there is no LED loading, the LED Driver enters a capture mode where the MCU is scanning ILED while the Driver output is performing in a burst mode. Performing the burst mode operation includes the MCU intermittently turning on and off the DC/DC Controller via the control signal CS1. Effectively, the output of the Driver is turned off because of the intermittent and short turn-on time during the burst mode operation. The MCU may terminate the capture mode once a LED load is connected.

In another scenario, for example, when the LED load is removed with the system is being energized, the LED Driver may enter capture mode (with corresponding burst mode condition at the output). Before reconnecting the LED load, a voltage at Cout becomes zero, and as such, when the LED load is connected or re-connected, effects of "hot-plugging" or "hot-switching" are avoided. As such, the LED load is protected from failures that may otherwise be experienced due to transient currents during a hot-swap as well if there are loose LED connections.

As illustrated in FIGS. 1A and 1B, the MOSFET switch Q4 may be controlled by the MCU via the control signal CS2. FET Q4 may turn on very briefly before locking a maximum output of the LED Driver. When Q4 is turned on, Q4 may provide a low impedance path through resistor R3. The low impedance path across the capacitor Cout may accelerate the discharge of the capacitor Cout at the output of the Driver. Within examples, if a residual charge is present after performing a burst operation, resistor R3 may dissipate the residual charge and thereby provide additional protection to the LED during sudden AC Main interruptions, loose LED connections, and/or hot-swapping of the LED load.

Figure 2:
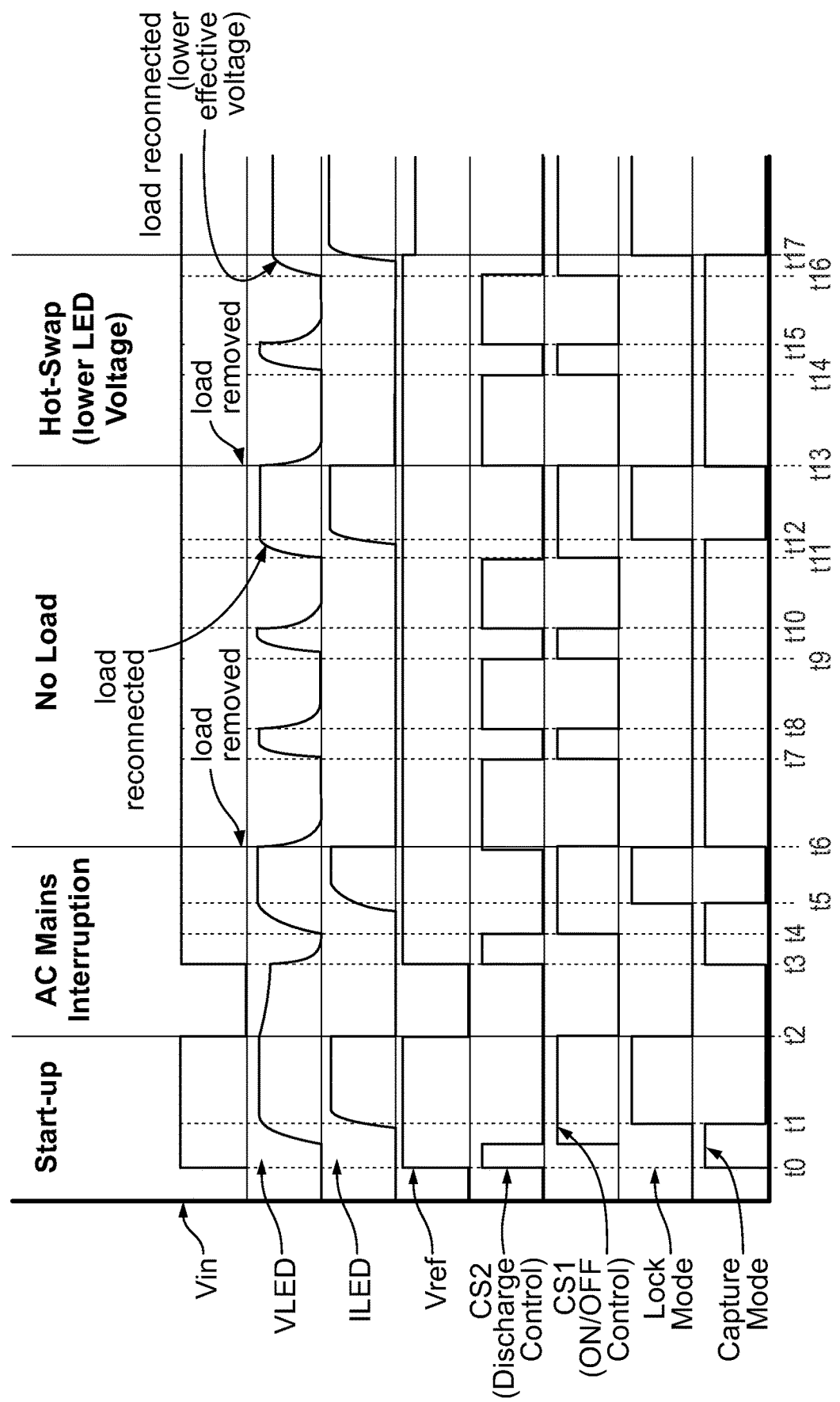
FIG. 2 depicts a timing diagram providing waveforms for a LED driver configured to drive a LED load, according to an example implementation of the present invention.

Continuing to FIG. 2, FIG. 2 provides a timing diagram providing waveforms for a LED driver configured to drive a LED load, such as the example provided in FIGS. 1A and 1B and described above herein. References to circuit components, signals, and values may relate to those described above regarding FIGS. 1A and 1B. More particularly, FIG. 2 may depict the example responses of the system described herein, include the LED Driver of FIGS. 1A and 1B, when example interruptive events occur. Such events may include an AC Main Interruption (i.e., Vin goes to zero), intermittent or zero-loading (i.e., loose connections, etc.), and/or a hot-swap.

FIG. 2 is broken into various time segments to provide example response of the circuit described herein. To begin, from t0-t1 provides an example Startup Response of the systems and circuits described herein. Startup begins at t0 with the supply source Vin turned on and the MCU circuit initially operating in a capture mode. At t1, the LED Driver locks the VLED level (i.e., lock mode), when the predetermined current ILED is reached. Moreover, ILED scanning through capture mode of the MCU is ended before performing the lock mode operation. From t1-t2 the system may be considered in a steady-state operation.

Continuing, from t2-t6 provides an example response during an AC Main Interruption. A sudden AC Main Interruption occurs at t2 and the charge of the output capacitor Cout slowly goes down. Turning on the Driver with a charge at the output capacitor Cout may build up voltage that could induce a transient current. Unlike a resistive load, a LED array load switches to an open circuit immediately after the voltage across it becomes less than its effective forward voltage. When the AC Main input returns, discharge control signal CS2 is activated in order to ensure that the capacitor Cout is fully discharged before turning on the Driver. This will protect the LED from any transient current. The period t3-t4 is the Cout discharge period, and it depends on the time constant that is calculated by multiplying the capacitance value of Cout and the resistance of the corresponding bleeder resistor (i.e., R3 in FIG. 1B). In some examples, the discharge period t3-t4 may be approximately 100 ms. In other examples, other time periods are possible. After discharging the capacitor Cout, the system from t4-t5 re-energizes the LED similar to Startup Response (t0-t1) followed by the steady-state shown from t5-t6.

Continuing, from t6-t12 provides an example response when the LED load is removed. Lock mode is released when the LED load is removed at t6. The MCU enters the capture mode (or turns capture mode on), and regularly scans the operating LED load voltage range until a load current is detected. When the capture mode is enabled at t6, the LED driver is turned off by control signal CS1 and bulk capacitor residual voltage is discharged by CS2 through resistor R3 and FET Q4 (in the process also described above relating to FIGS. 1A and 1B). The LED Driver is now primed for a fresh restart and the cycle continues until a load is detected at t12.

During scanning of the LED load voltage range, the LED driver operates in burst-mode. Within examples, values for burst mode on-time (e.g. t7-t8) and off-time (e.g. t6-t7) would be 0.5 s and is respectively. The on-time value may depend on the VLED rise-time, while extending the off-time may increase no-load efficiency but also decrease LED driver responsiveness to LED load insertion.

Continuing with FIG. 2, from t13-t17 provides an example response when the LED load is hot-swapped out for a load with a lower LED voltage. Hot-swaps to load rated LED loads may usually result in a high load transient current, with increasingly destructive energy the higher the voltage difference and output bulk capacitances. As provided in FIG. 2, the LED load is removed at t13, and thus capture mode is enabled due to a no-load condition. When a lower rated LED load is connected between t15 and t16, the load presence will be validated at t17. The MCU may then check the sampled LED voltage Vsampling, and set a new reference voltage Vref proportional to VLED. The LED Driver output voltage will then be locked.

CONCLUSION

The present disclosure is not to be limited in terms of the particular implementations described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example implementations described herein and in the figures are not meant to be limiting. Other implementations can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

What is claimed is:

1. A method, comprising:
   energizing a LED driver coupled to a microcontroller circuit (MCU);
   scanning, by the MCU, a LED load voltage outputted by the LED driver to a LED load until a minimum LED load current is detected, wherein the LED load is coupled to the LED driver;
   based on detecting the minimum LED load current, stopping the scanning of the LED load voltage;
   based on detecting the minimum LED load current, sampling the LED load voltage;
   determining, by the MCU, that a main voltage supply coupled to the LED driver is off;
   based on the determination that the main voltage supply is off, stopping the sampling of the LED load voltage;
   after determining that the main voltage supply was off, determining, by the MCU, that the main voltage supply has returned;
   based on the determination that the main voltage supply has returned, re-scanning the LED load voltage until the minimum LED load current is detected again;
   based on the determination that the main voltage supply has returned, dissipating, by the LED driver, a residual charge at an output capacitor of the LED driver until the output capacitor is discharged, wherein dissipating the residual charge reduces a risk of exposing the LED load to a transient current; and
   based on the output capacitor being discharged, re-energizing the LED driver.

2. The method of claim 1, further comprising:
   based on the determination that the main voltage supply has returned, transmitting, by the MCU, a discharge control signal to the LED driver, wherein the discharge control signal initiates the dissipation of the residual charge.

3. The method of claim 1, wherein the LED driver comprises a field-effect transistor; the method further comprising:
   turning on, by the MCU, a field-effect transistor (FET) coupled across the output capacitor; and
   dissipating, by a resistor coupled to the drain of the FET, the residual charge of the output capacitor.

4. The method of claim 1, further comprising:
   based on the sampled LED load voltage, setting, by the MCU, a reference voltage;
   determining that the outputted LED load voltage is approximately the reference voltage.

5. The method of claim 1, wherein the LED load current detected is a predetermined minimum load current.

6. The method of claim 1, wherein energizing the LED driver comprises ramping up a voltage to an effective LED load voltage.

7. A method, comprising:
   energizing a LED driver coupled to a microcontroller circuit (MCU);
   scanning, by the MCU, a LED load voltage outputted by the LED driver to a first LED load until a minimum LED load current is detected, wherein the first LED load is coupled to the LED driver;
   based on detecting the minimum LED load current, stopping the scan of the LED load voltage;
   based on detecting the minimum LED load current, sampling the LED load voltage of the first LED load;
   determining, by the MCU, that the first LED load is no longer coupled to the energized LED driver;
   based on the determination that the first LED load is no longer coupled, stopping the sampling of the LED load voltage;
   based on the determination that the first LED load is no longer coupled, re-starting the scanning of the LED load voltage until the minimum LED load current is detected;
   while the MCU is scanning the LED load voltage, turning on the LED driver for a predetermined short amount of time by a control signal from the MCU
   while the LED driver is on for the predetermine short amount of time, dissipating, by the LED driver, a residual charge at an output capacitor of the LED driver, wherein dissipating the residual charge reduces a risk of exposing the LED load to a transient current;
   after the short time has passed, turning off the LED driver and stopping the dissipating of the residual charge;
   determining that a second LED load is coupled to the LED driver;
   based on the determination that the second LED load is coupled to the LED driver, increasing the outputted LED load voltage until the minimum LED load current is detected;
   based on detecting the minimum LED load current, stop the scanning of the LED load voltage again; and
   based on detecting the minimum LED load current, begin sampling the LED load voltage of the second LED load.

8. The method of claim 7, further comprising:
   based on the sampled LED load voltage of the first LED load, setting, by the MCU, a reference voltage;
   determining that the outputted LED load voltage is approximately the reference voltage.

9. The method of claim 8, wherein the second LED load has a lower effective voltage than the first LED load, the method further comprising:
   based on the sampled LED load voltage of the second LED load, adjusting, by the MCU, the reference voltage proportionally to the difference between the sampled LED voltage of the first LED load and the sampled LED voltage of the second LED load.

10. The method of claim 7, wherein the second LED load has the same effective voltage compared to the first LED load.

11. The method of claim 7, further comprising:
    determining, by the MCU, that a main voltage supply coupled to the LED driver is off;
    based on the determination that the main voltage supply is off, stopping the sampling of the LED load voltage;

after determining that the main voltage supply was off, determining, by the MCU, that the main voltage supply has returned;

based on the determination that the main voltage supply has returned, re-scanning the LED load voltage until the minimum LED load current is detected again;

based on the determination that the main voltage supply has returned, dissipating, by the LED driver, a residual charge at an output capacitor of the LED driver until the output capacitor is discharged; and based on the output capacitor being discharged, re-energizing the LED driver.

12. A system, comprising:

a LED driver circuit, comprising:
  an electromagnetic interference filter (EMI);
  a power factor correction circuit (PFC) coupled to the EMI; and
  a direct current to direct current converter (DC/DC converter), wherein a voltage supply is coupled to the DC/DC converter, and further wherein the PFC is coupled to the DC/DC converter, and wherein the DC/DC converter comprises an output capacitor, a field-effect transistor (FET), and a resistor, wherein the resistor is coupled to a drain of the FET and the MCU is coupled to a gate of the FET, and further wherein the FET and resistor are together coupled across the output capacitor;

a LED load coupled to an output of the DC/DC converter, wherein the LED load is coupled across the output capacitor of the DC/DC converter; and a microcontroller (MCU) coupled to the LED driver circuit, configured to:
  sample a plurality of signals from the LED driver circuit;
  determine if an interruption event has occurred; and
  if the interruption event has occurred, prevent a transient current from damaging the LED load by turning on the FET in order to dissipate, by the resistor, a residual charge of the output capacitor.

13. The system of claim 12, wherein the MCU is further configured to:
  determine a voltage reference signal based on a sampled LED load voltage;
  provide the voltage signal to a constant voltage circuit of the DC/DC converter, wherein the constant voltage circuit is configured to regulate an output voltage if the LED load is uncoupled from the DC/DC converter.

14. The system of claim 13, wherein the MCU is further configured to:
  adjust the voltage reference signal based on another sampled LED load voltage.

15. The system of claim 12, wherein the interruption event comprises an interruption of the voltage supply to the DC/DC converter.

16. The system of claim 12, wherein the interruption event comprises removing the LED load coupled to the output of the DC/DC converter and replacing the LED load with another LED load, wherein the LED load and the other LED load each have a different effective voltage.

17. The system of claim 12, wherein the interruption event comprises intermittently removing and then recoupling the LED load to the output of the DC/DC converter.

* * * * *